US009405007B2

(12) United States Patent
Luthi et al.

(10) Patent No.: US 9,405,007 B2
(45) Date of Patent: Aug. 2, 2016

(54) ELECTRO-OPTIC DISTANCE-MEASURING DEVICE

(71) Applicant: LEICA GEOSYSTEMS AG, Heerbrugg (CH)

(72) Inventors: Thomas Luthi, Aarau (CH); Burkhard Bockem, Brugg (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 14/394,217

(22) PCT Filed: Mar. 6, 2013

(86) PCT No.: PCT/CH2013/000037
§ 371 (c)(1),
(2) Date: Oct. 13, 2014

(87) PCT Pub. No.: WO2013/155637
PCT Pub. Date: Oct. 24, 2013

(65) Prior Publication Data
US 2015/0077758 A1    Mar. 19, 2015

(30) Foreign Application Priority Data

Apr. 16, 2012 (EP) ..................................... 12405038

(51) Int. Cl.
*G02B 6/00* (2006.01)
*G01S 17/32* (2006.01)
*G01S 17/36* (2006.01)
*G01S 7/491* (2006.01)
*G01S 7/499* (2006.01)
*G01B 11/14* (2006.01)

(52) U.S. Cl.
CPC ................. *G01S 17/32* (2013.01); *G01B 11/14* (2013.01); *G01S 7/491* (2013.01); *G01S 7/499* (2013.01); *G01S 17/36* (2013.01)

(58) Field of Classification Search
CPC ..... G02F 1/365; G02F 1/3775; G02B 6/1225; G02B 6/00
USPC ....................................... 385/1, 2, 3, 4, 8, 122
See application file for complete search history.

(56) References Cited

U.S. PATENT DOCUMENTS 3,424,531 A    1/1969   Bender et al.
4,606,638 A    8/1986   Sommargren
(Continued)

FOREIGN PATENT DOCUMENTS

CN    101076743    11/2007
CN    101952741    1/2011
(Continued)

OTHER PUBLICATIONS

Loayssa et al., "Design and Performance of the Bidirectional Optical Single-Sideband Modulator", Journal of Lightwave Technology, Apr. 2003, pp. 1071-1082, vol. 21, No. 4.

*Primary Examiner* — Jennifer Doan
(74) *Attorney, Agent, or Firm* — Rankin, Hill & Clark LLP

(57) ABSTRACT

A distance measuring device includes a light source emitting light, and an integrated electro-optic modulator arranged such that the emitted light passes through an optical waveguide of the electro-optic modulator in a first direction before being emitted from the distance measuring device, and after being reflected from a target passes through the electro-optic modulator in a second direction which is opposite to the first direction. The forward electro-optic response of a modulating region of the electro-optic modulator is the same as the backward electro-optic response, and a center of gravity of the modulation is independent of modulation frequency.

13 Claims, 2 Drawing Sheets

(56) References Cited

U.S. PATENT DOCUMENTS

| | | |
|---|---|---|
| 4,979,178 A | 12/1990 | Beausoleil et al. |
| 5,208,697 A | 5/1993 | Schaffner et al. |
| 5,764,360 A | 6/1998 | Meier |
| 6,483,953 B1 | 11/2002 | McBrien et al. |
| 6,879,402 B2 | 4/2005 | Kuchel |
| 7,609,387 B2 | 10/2009 | Meier |
| 8,305,563 B2 | 11/2012 | Luethi et al. |
| 8,483,523 B2 * | 7/2013 | Nakagawa ....... B29D 11/00663 385/40 |
| 8,981,297 B2 | 3/2015 | Boeckem et al. |
| 2015/0070709 A1 | 3/2015 | Porte et al. |

FOREIGN PATENT DOCUMENTS

| | | |
|---|---|---|
| EP | 0313518 | 4/1989 |
| EP | 1 444 482 | 5/2010 |
| EP | 2381269 | 10/2011 |
| JP | 60-123704 | 7/1985 |
| JP | 1-141388 | 6/1989 |
| JP | 6-160785 | 6/1994 |
| JP | 7-128623 | 5/1995 |
| JP | 9-230296 | 9/1997 |
| JP | 9-236783 | 9/1997 |
| JP | 09236783 A * | 9/1997 |
| JP | 10-512965 | 12/1998 |
| JP | 11-183858 | 7/1999 |
| JP | 2002-544538 | 12/2002 |
| JP | 2003-295141 | 10/2003 |
| JP | 2005-9956 | 1/2005 |
| JP | 2005-509875 | 4/2005 |
| JP | 2008-516246 | 5/2008 |
| JP | 2011-81362 | 4/2011 |
| JP | 2011-514513 | 5/2011 |
| JP | 2011-252942 | 12/2011 |
| JP | 2013-524248 | 6/2013 |
| JP | 2015-519598 | 7/2015 |

* cited by examiner

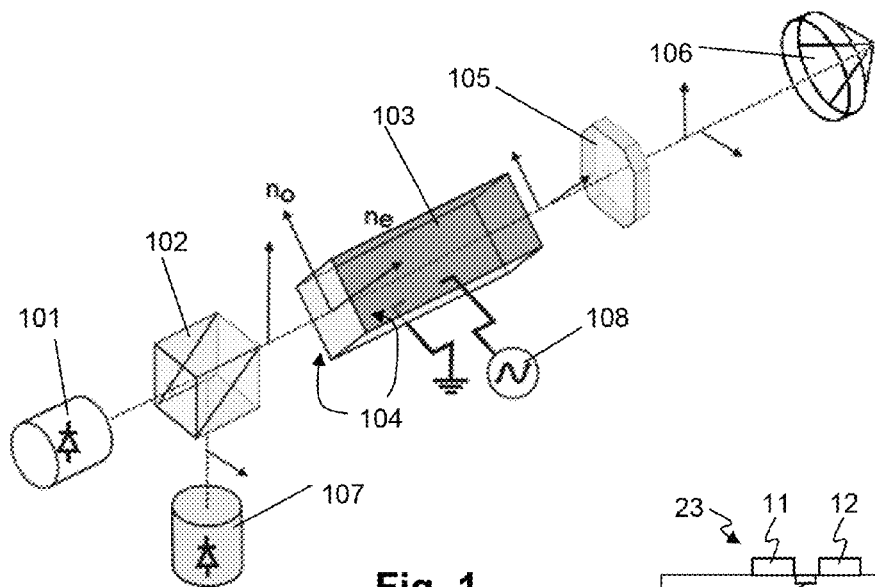
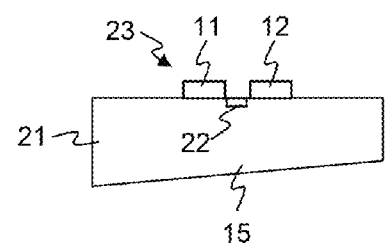
Fig. 3b
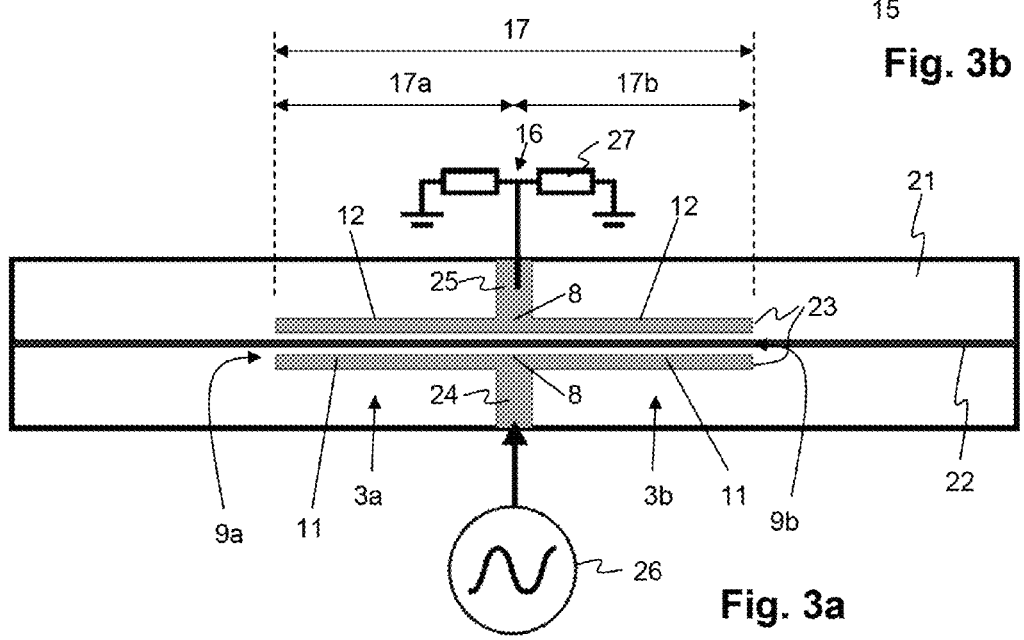
Fig. 3a

ELECTRO-OPTIC DISTANCE-MEASURING DEVICE

BACKGROUND OF THE INVENTION

1. Field of the Invention

The invention relates to au electro-optic distance measuring device.

2. Description of Related Art

Relevant distance-measuring devices are known from EP 0 205 406, EP 0 313 518, EP-A-1 647 838, WO 97/18486 and EP patent application number 10 405 078, for example. The content of these applications is incorporated in their entirety by reference for elucidating the functioning of the Fizeau method for absolute distance measurement. U.S. Pat. No. 3,424,531 describes a distance measurement device using a light modulator that turns light transmission on and off, similar to a rotating tooth-weel.

FIG. 1 schematically shows a distance measuring device for measuring absolute distance according to the prior art: A light source 101 emits light, typically in the visible or infrared range, with center wavelength λ, the spectral width Δλ of the source being broad enough in order to ensure a low coherence light emission. The parallel light beam emitted by the broadband source 101 illuminates a polarising beam splitter 102, which ensures a linear polarization state for one of the transmitted beams. The polarized beam passes through an electro-optic crystal 103 having electrodes 104 on opposite sides. The incident light beam is polarized at 45° to the main axes of the electro-optic crystal 103, called slow (extraordinary) and fast (ordinary) axis, with different refractive indices $n_e > n_o$, respectively. Two waves resulting from the projection on the orthogonal axes of the incident light field propagate in the electro-optic crystal 103 with a 90° polarization angle between them. The electrodes 104 allow to apply an electric field parallel to one of the main crystallographic axis of the electro-optic crystal 103. A sinusoidal electric signal with a frequency f is generated by a signal source 108 and applied to the electrodes 104. This electric field generates a modification of the refractive index difference between the slow and the fast optical axes of the crystal. A phase modulation is thus introduced between the two orthogonal waves. The value of the index of modulation relative to the slow axis $\alpha_s$ and to the fast axis $\alpha_f$ depends on the electro-optic coefficient r of the for the crystal orientation considered, on the cube of the refractive index of the slow and fast axis respectively, on the distance gap between the electrodes, on the crystal length and on the optical wavelength, and on the voltage amplitude of the electrical signal. The polarization directions(s) along the path of the light indicated by small arrows.

At the output of the electro-optic crystal 103, a quarter wave plate 105 is placed with its axes oriented at 45° with respect to the main axes of the electro-optic crystal 103. The light beam after passing through the quarter wave plate 105 passes on, along the distance to be measured, to reach a target. A corner mirror 106 or other reflecting element is fixed to the target, reflecting the light back to the optical source. After passing a second time through the quarter wave 105 plate, the two orthogonal waves of the returning light are rotated by 90° and cross the electro-optic crystal 103 a second time, now in the opposite direction. The wave, which was modulated the first time along the slow axis, is now modulated along the fast axis, while the wave, which was modulated along the fast axis the first time, is now modulated along the slow axis. The modulation being experienced by the light is the same for the light passing in the forward and backward direction, but is a delayed by the time of flight of the wave on its way to the target and back. The returning light and part of the emitted light are then recombined at the second polarizer output port. The two resulting linear waves can now interfere. The resulting beam, modulated in amplitude according to the interference, is captured by a photoreceiver 107.

Thus, basically, a light beam, from a laser or from a broadband light source, is generated, and guided by a focusing optical unit onto a polarizing beam splitter for linearly polarizing the light, and is subsequently guided onto a measurement path by an electro-optical modulator, a lambda/4 retarder and an exit optical unit. Light returning along the measurement path passes through the elements mentioned as far as the polarizing beam splitter and is guided onto a detector by the latter. An evaluation unit serves for determining the length of the measurement path on the basis of the detector signal.

What is of relevance in the present context is that, in this method, outgoing and returning measurement light is modulated in a modulator. By variation of the frequency of the modulation, a minimum of the intensity of a detected measurement light beam is determined (or substantially synonymously, a zero-crossing of the derivative of the intensity). The length of the measurement path between the measurement device and a retroreflector or a semi-cooperative target is determined from the minimum frequency. A semi-cooperative target returns at least part of incident light along the direction of the incident light, e.g. by diffuse reflection.

Current implementations of Fizeau-principle based distance-measuring devices use electro-optic modulators with bulk crystals exhibiting the Pockels-effect. In order to reach the voltages of several 100 V (over a crystal width of ~1 mm) required for full modulation, the modulator needs an electrical drive-power of ~1 W, and the crystal is placed in an electrical resonator. Setting a particular modulation frequency requires mechanical tuning of the resonator, thus limiting the measurement rate (to e.g. 20 Hz).

It is desirable to speed up the measurement by using an integrated optics modulator in a distance measurement device. However, since the measurement principle of the distance measurement device requires the light to pass the modulator twice, in opposing directions, known single pass modulators are not suitable.

SUMMARY OF THE INVENTION

It is therefore an object of the invention to create a distance measuring device, using an integrated optics modulator which is traversed by both outgoing and returning light.

A further object of the invention is to create a distance measuring device having an electro-optical modulator which can be operated with lower modulating voltages and with lower power consumption than known modulators.

The electro-optic distance measuring device thus includes an integrated electro-optic modulator which, in turn, includes an optical waveguide of a nonlinear optical material, and travelling wave electrodes arranged to generate a (travelling) electrical field in a modulating region of the waveguide when a voltage is applied to the electrodes, thereby modulating the phase of light passing through the waveguide. Therein the forward electro-optic response of the modulating region is the same as the backward electro-optic response (in other words: the effect, such as the phase shift, on light passing the modulator in one direction and light passing in the opposite direction is the same).

In an embodiment, the electro-optic response in the used modulation frequency range has a flat (e.g. low-pass or bandpass) characteristic. In an embodiment, this means that over a bandwidth over 125 MHz the loss of electro-optic response is less than 25%, or that over a bandwidth over 125 MHz the electro-optic response varies by less than 25%.

This allows the use of the modulator in an application in which two beams of light pass through the modulator in opposite directions and where it is important that the two beams be modulated with a high frequency, e.g. in the GHz range, in essentially the same manner.

Note: A "band-pass characteristic" means, as is commonly brown, that the electro-optic response is essentially zero when a DC voltage is applied to the electrode line, and with increasing frequency rises to a maximum and then falls again at least once. Similarly, a "low-pass characteristic" means that the electro-optic response is essentially at its maximum ("initial maximum") when a DC voltage is applied to the electrode line, and with increasing frequency falls continuously, either for all frequencies, or only up to a particular frequency, at which it reaches a minimum after which it rises again to a further maximum, usually to a level lower than the initial maximum, and falls again. This falling and rising may repeat itself for increasing frequencies, usually with decreasing height of the maxima.

Note: An optical waveguide is a physical structure that guides electromagnetic waves in the optical spectrum. Common types of optical waveguides include optical fibers and rectangular waveguides. In an optical waveguide, only selected modes of the light can propagate along the length of the waveguide, since the lateral dimensions of the waveguide (that is, the dimensions orthogonal to the length of the wave guide, along which the light propagates) are within the range of a few wavelengths of the light.

In contrast to this, in a bulk crystal or volume crystal, the lateral dimensions are significantly larger than the wavelength of the light or the diameter of a beam of light passing through the crystal, and the propagation of different modes of the light is not affected by the dimensions of the crystal. Depending on the type of crystal, the light may of course be affected by other properties of the crystal (refraction, dispersion, etc. . . . ). Different from a waveguide, a bulk crystal or volume crystal does not have a light guiding function.

With such an integrated optics modulator with a very small waveguide and electrode separation, the field strength required for full modulation is thus reached with a modulation voltage of only a few Volts, resulting in a dramatic reduction of drive-power and no need for an external resonator and its time consuming mechanical tuning any more.

In an embodiment, the center of gravity of modulation is independent of modulation frequency. The center of gravity of modulation is a point along the waveguide. Its location $y_{COG}$ is defined as the integral, over the position along the waveguide, of the product of the phase modulation per unit length a with the position y, divided by the integral, over the position along the waveguide, of the phase modulation. That is $$y_{COG} = \int_{y1}^{y2} a(y) y \, dy / \int_{y1}^{y2} a(y) \, dy$$

where y1 and y2 are the beginning and the end position of the modulation region along the waveguide axis Y. As a result, the center of gravity of modulation divides the waveguide into two sections, with the total modulation of the light in both sections being the same the total modulation in one section is the integral of the modulation along the section).

The distance measuring device includes the electro-optic modulator. This allows the distance measuring device to perform at a high measurement rate with high accuracy and with low power consumption.

In an embodiment, the distance measuring device includes a light source emitting light, with the electro-optic modulator being arranged in the distance measuring device such that light emitted by the light source passes through the electro-optic modulator in a first direction before being emitted from the distance measuring device, and such emitted light after being reflected from a target outside the distance measuring device passes through the electro-optic modulator in a second direction which is opposite to the first direction.

In an embodiment, the modulating region includes a first subregion and a second subregion and the electrode line is capable to effect on light passing in one direction through the first subregion the same modulation as on light passing in the opposite direction through the second subregion.

The superposition of the electrical fields from the two line sections affecting the modulation region results in the electrical field in the waveguide oscillating like a standing wave, symmetrical along the length of the lines, which in turn causes the symmetrical optical response.

In an embodiment, the electrodes comprise a first branch and a second branch and a midpoint between the two branches, wherein the electrodes are able, when connected to an electric microwave signal source, to generate an electrical field distribution in the waveguide that is symmetrical with respect to the midpoint.

As a result, light passing through the waveguide along the length of the modulating section in one direction experiences the same total phase shift (which is the integral of the time dependent and location dependent voltage induced phase shift along the modulating section) as light passing in the opposite direction at the same time. In other words, the forward electro-optic response is the same as the backward electro-optic response.

Such a symmetrical configuration regarding the electrical properties of the branches allows to get the same electro-optic response in the forward and in the backward directions of propagation of light in the optical circuit. The symmetrical configuration regarding the electrical properties can be obtained by geometric symmetry of the branches.

Thus, in an embodiment, the shape of the electrode line comprising the first and the second branch is symmetric with respect to the midpoint. The shape of the electrode line may be mirror-symmetric with respect to a plane passing through the midpoint and normal to the waveguide. Alternatively, the shape of the electrode line can have a rotational symmetry around an axis passing through the midpoint and normal to the plane in which the electrode line lies.

In an embodiment, a bottom face of the substrate, opposed to the surface at which the waveguide and electrode line are arranged (top surface), is not parallel to the top surface, or in other words, the bottom face is inclined relative to the opposite, top surface (wedged shape). The substrate thus has the shape of part of a wedge. This reduces or eliminates acoustical resonances that may arise in the substrate due to the piezo-electrical effect.

In summary, the electro-optic modulator includes one or more of the following features:
  A birefringent electro-optic crystal.
  The ordinary and extraordinary axes are orthogonal to the direction of propagation of light.
  The direction of propagation of light is parallel to one of the ordinary axis
  The symmetrical configuration allows to get the same electro-optic response in the forward and in the backward directions of propagation of light in the optical circuit.

BRIEF DESCRIPTION OF THE DRAWINGS

The subject matter of the invention will be explained in more detail in the following text with reference to preferred exemplary embodiments which are illustrated in the attached drawings, which schematically show:

FIG. 1 the structure of an optical distance measuring device for measuring absolute distance;

FIGS. 3a, 3b an integrated phase modulator with symmetrical electrodes; and

DETAILED DESCRIPTION OF THE INVENTION

In principle, identical parts are provided with the same reference symbols in the Figures.

Convention: A phase modulator uses an electro-optic crystal. The index of modulation will define the so-called half wave voltage $V\pi$. The half-wave voltage is a characteristic of an electro-optic modulator and corresponds to the voltage that needs to be applied to the crystal in order to modify the optical phase of transmitted light by $\pi$-radians.

A guided wave configuration of an electro-optic modulator is as follows: a straight optical waveguide is shaped in a crystal surface, allowing the confinement of light in a small channel whose cross section is of some micrometers in width and height. Coplanar electrodes are arranged near the waveguides with a gap of some micrometers, application of a strong electric field to the waveguide. The half wave voltage can reduced to a few volts, much less than for bulk crystal modulators.

Guided wave modulators in, e.g. lithium niobate, can work at very high frequencies, thanks to this low voltage configuration. Special travelling wave electrodes, made of coplanar waveguides (CPW) microwave lines allows to get a phase matching condition between the optical wave propagating in the waveguide and the microwave propagating in the CPW lines, both waves travelling in the same direction and at the same velocity. Generally, in a high speed travelling wave integrated optic modulator, the microwave electrical signal is fed by one side of the modulator to the input strip of the CPW line, close to the optical input of the waveguide. The end of the microwave line is set near the optical waveguide output.

Figure 2A:
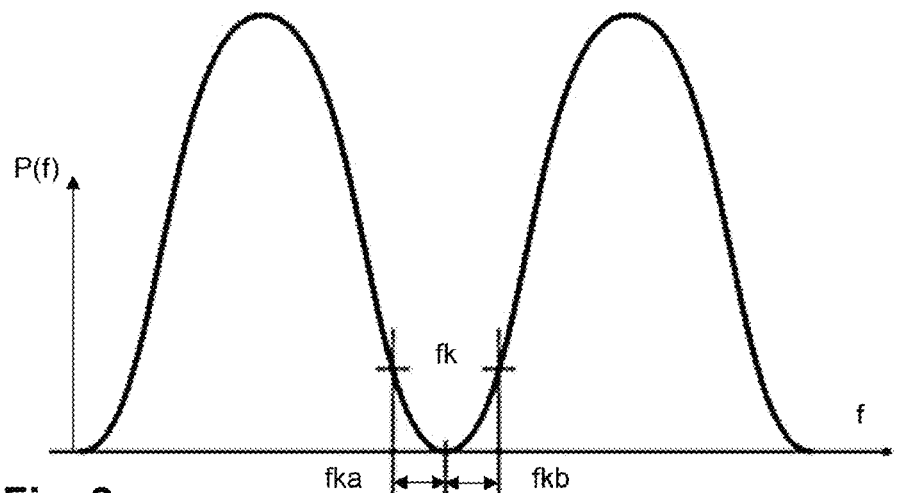
FIGS. 2a, 2b the frequency dependence of a signal measured in the distance measuring device.
Figure 2B:
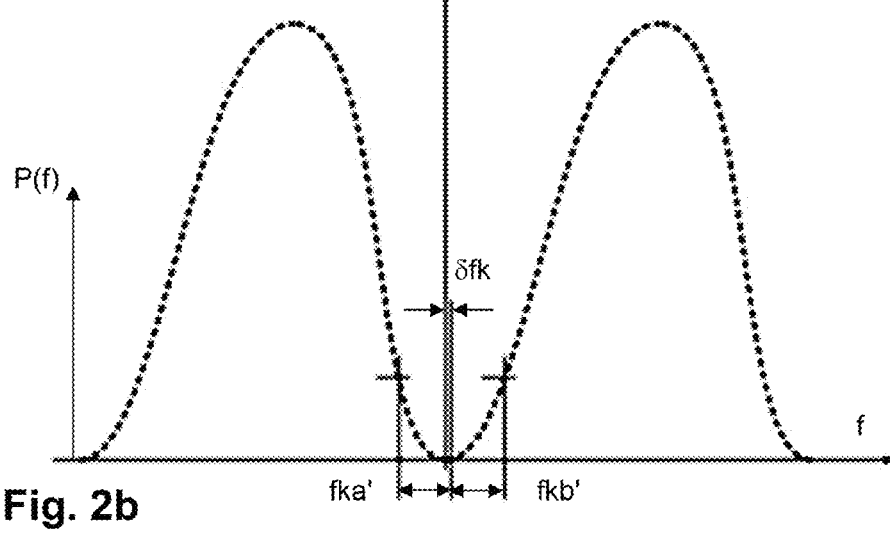

Using an integrated phase modulator in a distance meter arrangement as in FIG. 1, it can be shown that the shape of the average electrical power P(f) at the output of the photoreceiver 107, as a function of modulation frequency, is similar to the curve shown in FIG. 2a. The main property is that the zeros of P(f) remain in place. Ideally, the curves are symmetrical, which is a precondition for the distance measurement, which needs to determine a zero point of the curve. In one method for determining the zero point, rather than determining the zero point itself, two points to the left and right of the zero point having the same power P(fka)=P(fkb) are determined. The frequency of the zero point, assuming symmetry of the curves, is then computed as (fka+fkb)/2. However, depending on the geometrical and physical properties of the microwave electrodes, the shape of the curve around the zero points may become asymmetrical. This is shown in FIG. 2b. This, in turn, distorts the distance measurement. With the criterion P(fka)=P(fkb), the asymmetry can cause the resulting (fka+fkb)/2 to be different from the correct fk, introducing an error in the determination of the absolute distance L.

Furthermore, it is possible to demonstrate that if the electrodes are fed just by the middle of the electrode lines. P(f) becomes equal to zero, and a perfect symmetry of the response of the modulator is recovered for both the forward and backward directions of propagation of light. Furthermore, the center of gravity of modulation remains at the same location, independent of the modulation frequency.

A possible design is, thus, that two parallel lines are fed by an input electrical strip set at the exact center of the electrodes, yielding a perfect symmetry to the device whose response is totally independent of the direction of propagation of the light.

FIG. 3a in a top view and FIG. 3b in a cross sectional view show such an integrated phase modulator with such symmetrical electrodes: In a substrate 21, a waveguide 22 is embedded, and a coplanar electrode pair 23 is arranged to apply a field to the waveguide 22. One electrode of the electrode pair 23 is fed by an input strip 24 or first contact section from, for example, a signal generator 26, the other electrode is connected by an output strip 25 or second contact section to, for example, a termination resistor arrangement 27.

The electrodes 23 include a first branch 3a and a second branch 3b. These branches 3a, 3b both start at the first and second contact sections, i.e. at the input strip 24 and output strip 25 (both, for example, of microstrip type), but extend along the waveguide 22 in opposite directions. Each of the branches 3a, 3b includes a first electrode section 11 connected at one end to the input strip 24 and running along the waveguide 22, and a second electrode section 12 connected at one end to the output strip 25 and running along the waveguide 22. The first and second electrode sections 11, 12 can be arranged symmetrically with regard to the waveguide 22. Each of the branches 3a, 3b ends at a corresponding branch endpoint 9a, 9b. The input strip 24 is electrically connected to and supplied by a signal generator 26, the output strip 25 is electrically connected to a termination element such as a resistor 27, whose impedance can be matched to the characteristic impedance of the electrodes. The input strip 24 and output strip 25 are located at a midpoint 16 along the length of the electrodes and are preferably symmetrically shaped and attached, each by a T-coupler 8, to the beginning of the first line sections 11 and the second line sections 12, respectively.

The electrodes 23 give the electro-optic modulation response a low pass filter characteristic and consequently are not ideally suited to work at high frequencies (e.g. in the GHz range). This effect can be reduced to a limited degree by shortening the electrode length, but this in turn increases the required half wave voltage $V\pi$.

An electrical signal on the electrode branches 3a, 3b generates an electrical field in the vicinity of the branches 3a, 3b. A section of the waveguide 22 in which this field affects the light passing along the waveguide 22 shall be called modulation region 17. Its length is essentially the length of the electrode along the waveguide 22, in other words, the sum of the extension of the first and second branch 3a, 3b. For each branch 3a, 3b, the electrical fields of the two sections 11, 12 are superposed, with the resulting superposed or total field affecting the modulation region 17. The first branch 3a influences the light in a first subregion 17a, the second branch 3b influences the light in a second subregion 17b of the modulation region 17. In the embodiment presented in the present application, the electrode length essentially equals the length of the modulation region 17, and the extension of each branch 3a. 3b equals the length of the corresponding subregion 17a, 17b.

FIG. 3b shows a cross section along the XZ-plane of the integrated phase modulator of FIG. 3a. In addition to the elements already described, this figure schematically shows a bottom face 15 opposite the face carrying the electrode lines and having an inclined or wedged surface. This eliminates or at least reduces acoustical resonances that may be generated when the electrical signal is applied to the electrodes 23.

Figure 4:
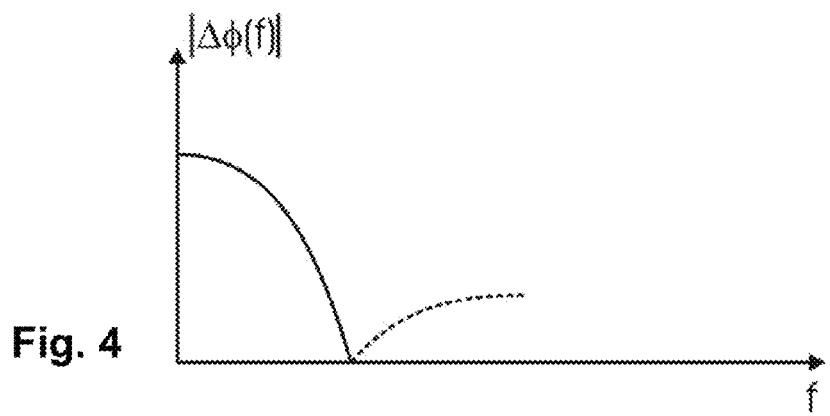
FIG. 4 the frequency response of the amplitude of the electro-optical phase modulation of the modulator of FIG. 3.

FIG. 4 schematically shows the frequency response of the amplitude of the electro-optical phase modulation $\Delta\phi(f)$: The amplitude of the phase modulation applied to the light wave propagating in the waveguide 22 follows a low pass function. That is, the amplitude has its maximal value at a frequency of zero, has lower values for nonzero frequencies, and falls monotonically up to a certain frequency, after which it can rise and fall again repeatedly, but only up to maximal values that decrease one after the other as the frequency increases. The frequency response can be simulated, given the geometry of the modulator and in particular of the electrodes. Conversely, given a particular requirement regarding the frequency response, such as a condition on the flatness of the response in a particular frequency range, it is straightforward to design the modulator and in particular the size of the electrodes.

A distance measuring device utilising an integrated modulator as presented in the foregoing preferably has a structure and is operated like the distance measuring device of FIG. 1, but with the bulk electro-optic crystal 103 replaced an integrated modulator 21, 22, 23 as described herein.

In an embodiment, the center frequency of the microwave signal is, for example, in the range between 2 and 3 GHz. The modulation bandwidth is, for example, in the range of several hundreds of MHz. This is well suited for distance measurement applications.

While the invention has been described in present embodiments, it is distinctly understood that the invention is not limited thereto, but may be otherwise variously embodied and practised within the scope of the claims. For example, whereas the embodiments shown so far use a single source connected to the input strip and a terminating resistance connected to the output, alternative embodiments can have a generalized impedance or a second source connected to the output.

The invention claimed is:

1. An electro-optic distance measuring device comprising an electro-optic modulator, wherein the electro-optic modulator is an integrated electro-optic modulator comprising an optical waveguide of a nonlinear optical material and electrodes arranged to generate an electrical field in a modulating region of the waveguide when a voltage is applied to the electrodes, and thereby to modulate the phase of light passing through the waveguide, and wherein
the forward electro-optic response of the modulating region is the same as the backward electro-optic response.

2. The distance measuring device of claim 1, wherein the electro-optic response of the modulating region has a flat characteristic.

3. The distance measuring device of claim 1, wherein the electro-optic response of the modulating region has a low-pass characteristic.

4. The distance measuring device of claim 1, wherein the electro-optic response of the modulating region has a band-pass characteristic.

5. The distance measuring device of claim 1, comprising a light source emitting light, the electro-optic modulator being arranged in the distance measuring device such that light emitted by the light source passes through the electro-optic modulator in a first direction before being emitted from the distance measuring device, and such emitted light after being reflected from a target outside the distance measuring device passes through the electro-optic modulator in a second direction which is opposite to the first direction.

6. The distance measuring device of claim 1, wherein a center of gravity of the modulation is independent of modulation frequency.

7. The distance measuring device of claim 6, wherein center of gravity of modulation divides the waveguide into two sections, with the total modulation of the light in both sections being the same.

8. The distance measuring device of claim 1, wherein
the modulating region comprises a first subregion and a second subregion and the electrodes are capable to effect on light passing in one direction through the first subregion the same modulation as on light passing in the opposite direction through the second subregion.

9. The distance measuring device of claim 1, wherein the electrodes comprise a first branch and a second branch and a midpoint between the two branches, wherein the electrodes are able, when connected to an electric microwave signal source, to generate an electrical field distribution in the waveguide that is symmetrical with respect to the midpoint.

10. The distance measuring device of claim 1, wherein the shape of the electrodes comprising the first and the second branch is symmetric with respect to the midpoint.

11. The electro-optic modulator of claim 10, wherein the shape of the electrodes is mirror-symmetric with respect to a plane passing through the midpoint and normal to the waveguide.

12. The distance measuring device of claim 10, wherein the shape of the electrodes has a rotational symmetry around an axis passing through the midpoint and normal to the plane in which the electrode line lies.

13. The distance measuring device of claim 1, in which a bottom face of the substrate, opposed to the surface at which the waveguide and electrode line are arranged, is wedged, that is, inclined relative to the opposite surface.

\* \* \* \* \*